United States Patent [19]

Wang et al.

[11] Patent Number: 5,440,705
[45] Date of Patent: Aug. 8, 1995

[54] ADDRESS MODULO ADJUST UNIT FOR A MEMORY MANAGEMENT UNIT FOR MONOLITHIC DIGITAL SIGNAL PROCESSOR

[75] Inventors: Bu-Chin Wang, Saratoga; Marita E. Daly, El Cerrito, both of Calif.

[73] Assignee: Advanced Micro Devices, Inc., Austin, Tex.

[21] Appl. No.: 516,984

[22] Filed: Apr. 30, 1990

Related U.S. Application Data

[62] Division of Ser. No. 836,025, Apr. 4, 1986, Pat. No. 4,935,867.

[51] Int. Cl.⁶ .............................................. G06F 12/06
[52] U.S. Cl. ................. 395/421.1; 364/255.1; 364/955; 364/DIG. 1; 364/DIG. 2; 395/411
[58] Field of Search ... 364/200 MS File, 900 MS File; 395/400

[56] References Cited

U.S. PATENT DOCUMENTS

| | | |
|---|---|---|
| 3,883,853 | 5/1975 | O'Brien et al. |
| 4,056,819 | 11/1977 | Lukas . |
| 4,150,434 | 4/1979 | Shibayama et al. ............ 364/704 |
| 4,169,289 | 9/1979 | Shively . |
| 4,202,305 | 5/1980 | Lane . |
| 4,456,953 | 6/1984 | Cohen et al. . |
| 4,584,666 | 4/1986 | Zolnowsky et al. . |
| 4,594,687 | 6/1986 | Kaneko et al. . |
| 4,627,017 | 12/1986 | Blount et al. . |
| 4,689,738 | 8/1987 | van Wijk et al. . |

Primary Examiner—Ken S. Kim
Attorney, Agent, or Firm—Foley & Lardner

[57] ABSTRACT

A memory management unit suitable fo use in a digital signal processor having internal and eternal memories is described. The unit is especially designed to facilitate numeric algorithms such as fast fourier transforms, auto-correlation and digital filtering by relieving the programmer from the need to monitor memory accesses. Automatic post-updating of memory addresses is provided after indirect memory references. Also, memory boundary-checking is performed according to a user-specified modulus value, and a memory reference is automatically adjusted to fall within the user-specified address range. A dual-access register file stores initial memory addresses and their associated modulus values and in a dual-bus embodiment a pair of address generation units provides post-updates of the addresses stored in the register files. Direct addressing of memory is also supported by the memory management unit and a page register internal to the unit allows the user to specify memory page information during a direct address operation. A modulo-adjust portion of the address generation unit implements any user-specified modulii in the range 0 to 64, as well as modulii of 128, 256 and 512. A method of operating a memory management unit to provide the features obtained by the instant invention is also described.

3 Claims, 6 Drawing Sheets

ADDRESS MODULO ADJUST UNIT FOR A MEMORY MANAGEMENT UNIT FOR MONOLITHIC DIGITAL SIGNAL PROCESSOR

CROSS-REFERENCE TO RELATED APPLICATION

This application is a division, of application Ser. No. 06/836,025, filed Mar. 4, 1986 now issued U.S. Pat. No. 4,535,867.

Related, application of particular interest to the instant application are U.S. Ser. No. 06/836,024, now abandoned entitled "Single/Dual-Access Storage Device", filed Mar. 4, 1986 now abandoned and continuing application 07/309,976 entitled "A Storage Arrangement Having A Pair of RAM Memories Selectively Configurable for Dual Access and Two Single Access RAMs now issued U.S. Pat. No. 4,893,279 and assigned to the assignee of the instant application.

FIELD OF INVENTION

The present invention is generally related to digital signal processors and signal processing systems and, in particular, relates to the design of modular architecture monolithic digital signal processors for real-time computation and memory based data manipulation and signal generation, analysis and modification.

BACKGROUND OF INVENTION

Signal processing generally refers to the performance of real-time operations on a data stream. Accordingly, typical signal processing applications include or occur in telecommunications, image processing, speech processing and generation, spectrum analysis and audio processing and filtering. In each of these applications, the data stream is generally continuous. Thus, the signal processor must produce results. "through-put", at the maximum rate of the data stream.

Conventionally, both analog and digital systems have been utilized to perform many signal processing functions. Analog signal processors, though typically capable of supporting higher through-put rates, are generally limited in terms of their long term accuracy and the complexity of the functions that they can perform. In addition, analog signal processing systems are typically quite inflexible once constructed and, therefore, best suited only to the singular application anticipated in their initial design.

A digital signal processor provides the opportunity for enhanced accuracy and flexibility in the performance of operations that are very difficult, if not impractically complex, to perform in an analog system. Additionally, digital signal processor systems typically offer a greater degree of post-construction flexibility than their analog counterparts, thereby permitting more functionally extensive modifications to be made for subsequent utilization in a wider variety of applications. Consequently, digital signal processing is preferred in many applications.

The process of digital signal processing typically implements a numeric algorithmic operation performed on a digital data stream sampled over time. The end result of the algorithmic operation, depending on the nature of the algorithm, can readily provide for the modification or analysis of the digital data stream or for the generation of a new data stream based on some aspect of the original data stream input. Central to the implementation of such algorithmic operations are the use of numeric algorithms for performing differential equation solving, Fourier transforms, auto-correlation and digital filtering, among many others. A numeric Fourier equation solving algorithm generally takes the form of:

$$y(n) = ax(n) + bx(n-1) + cx(n-2),$$

where y(n) is the current output and x (n-k) is the current input at a time k previous (k=0,1,2,3 ...). Discrete or digital Fourier transforms, of the form:

$$X(k) = \sum_{n=0}^{N-1} x(n)e^{-j\omega k/N}$$

where k=0,1,2,3,...(n−1) with X(k) being the discrete transform of the digitally sampled signal X(n), are easier to implement numerically.

Alternately, decimation in time or frequency can be utilized to obtain substantially the same information. A decimation in time numeric algorithm generally takes the form of:

$$X = A + WB$$
$$Y = A - WB,$$

where A and B are of a time series of inputs represented as complex numbers, W is a decimation function and X and Y are decimated outputs. The decimation in time and frequency algorithms have the advantage of reduced numbers of multiplications and accumulations and the convenience of being executable within the same memory space that originally stores a series segment of the digital data stream being operated on.

A numeric implementation of the auto-correlation function is defined as:

$$R(k) = \sum_{n=0}^{N} x(n) * x(n + k)$$

where R(k) is the kth auto-correlation co-efficient and x(n) is the nth data sample.

Finally, a numeric digital filtering function may be generally defined as:

$$Y(n) = \sum_{i=0}^{M} A_i * x(n - i)$$

where Y(n) is the filter output on its nth iteration, $A_i$ is the ith filter co-efficient and x(n-i) is the data sample taken as the input at the nth iteration. It is to be recognized that each of these algorithms may require simultaneous access to two data values, or "operands" as they are called, in real-time processing.

There are many different approaches to implementing digital signal processors, each with its own strength and weaknesses. One approach has been to utilize a high speed digital multiplier circuit combined with a bit slice microprocessor. While this form of a digital signal processor is capable of obtaining extremely high through-put rates, its design and implementation is complex and often unique. Further, a multiplier-based signal processor has substantial power usage and physical space requirements.

To circumvent the complexities of the multiplier-based digital signal processor designs, though at a loss of some of the through-put rate capacity, component chip sets have been used. Each component chip is typically a monolithic unit designed specifically to function as part of the chip set and to support a particular aspect of the digital signal processor. Such chips may include a program sequencer chip, address generator chip and an arithmetic logic and shift unit chip. To its advantage, the system design complexity of realizing a completed digital signal processor, based on a chip set, is substantially reduced. Also the power usage and physical space requirements of the signal processor are similarly reduced.

Unfortunately, the loss in data through-put is directly linked to the multiple external interconnections required between the chips of the chip set. These external links impose a timing restriction that is not present in the data transfer between portions of the digital signal processor as implemented on a monolithic chip.

Accordingly, there is a substantial desire to implement a complete digital signal processor as a monolithic unit. Not only will this further reduce the power and physical space requirements of the processor system, but it will also provide an opportunity to substantially regain and maximize the data through-put capability of the processor.

The implementation of completely monolithic digital signal processors, however, is not without its constraints. The numeric algorithms implemented by many of the signal processing functions require a substantial amount of complex circuitry. Generally, little of this circuitry can be simply omitted, since to do so would directly compromise the flexibility of the monolithic digital signal processor in handling a variety of signal processing operations. Additionally, extensive generalization of the processing functions, thereby reducing the number of functional subcircuits required, imposes substantial time penalties as the processor's efficiency in performing specific functional operations is reduced. Further, there are practical limitations on the monolithic chip die size, generally related to fabrication yield and accurate reproducability, as well as power dissipation. Monolithic digital signal processors therefore face a loss of flexibility in order not to drastically compromise operating speed.

In view of the problems related to each of the various digital signal processor implmentations, a significant objective of those of skill in the art of designing and utilizing digital signal processors is to provid a digital signal processor system architecture that combines optimally featured flexibility with the capability of supporting a high data through-put rate while further being sufficiently compact for monolithic implementation. Naturally, the implementation must provide sufficient speed and efficiency of operation to operate at the desired peak data through-put rate as well as the flexibility to execute a wide variety of numeric algorithmic signal processing operations.

Of particular importance, is a memory management portion of the real-time digital signal processor which facilitates implementation of the various numeric algorithms described earlier, particularly insofar as they require simultaneous access to two data values stored in memory. Moreover, such memory management should provide flexible memory addressing, such as so-called "direct addressing" and "indirect addressing" of the data values in memory. An additional desirable feature of memory management is provision of automatic, hardware-based, modulo (n) address spaces. In the prior art, a user had to monitor memory accesses and design programs to assure integrity of memory boundaries.

In addition, the memory management portion should permit accessing a memory external to the monolithic device housing the digital signal processor. Such external memory can, for example, store data values obtained from, or destined for, a central processing unit (CPU) external to the device. In this fashion, an interface can be established between the digital signal processor and the outside world.

SUMMARY OF THE INVENTION

It is therefore a purpose of the present invention to provide a modular memory management unit suitable for inclusion in a monolithic digital signal processor that directly permits a wide degree of functional flexibility, both in terms of the signal processing operations that it supports and its system configurations that are possible to match the digital signal processor to its anticipated applications.

This is provided in the present invention by a digital signal processor memory management unit for selectively generating and providing data addresses for the accessing of data, the memory management unit being responsive to indirect address select control signals for the selective generation and provision of a corresponding address, the memory management unit comprising a first elements for storing a plurality of addresses, a second elements for respectively storing a like plurality of address qualifiers, in the form of qualification control signals having qualification corresponding fields elements, responsive to the indirect address select control signals, for selecting an address from the plurality of addresses as stored by the first means and its respective address qualifier from the plurality of address qualifiers as stored by the second elements and means for generating a data address, based on the selected address and in correspondence with the selected address qualifier, and for providing the generated data address for the accessing of data.

The digital signal processor (DSP) memory management unit of the instant invention is preferably used within a monolithic integrated circuit chip housing a sequencer for a programmable signal processor, an arithmetic unit, and an interface unit which controls access to a set of three random access memory (RAM) banks, two internal to the chip and one external to the chip. The memory management unit provides the control for data transfer between the RAM banks and internal registers including the arithmetic logic unit (ALU) ports of the DSP as well as indirect memory address updating.

The memory management unit of the instant invention facilitates digital signal processing implementing the various numeric algorithms described above so that applications operating at high speeds may be monitored in real-time. For instance, modulo arithmetic used in filtering application does not involve movement of data, but instead utilizes a hardware-controlled update of the indirect address pointer, thereby operating more quickly than the prior art. Moreover, the present invention allows the use of any integer modulus between 0 and 64, unlike the prior art which was restricted to powers of 2. Modulli of 128, 256, and 512 are also available. A limiting modulus of 1024 is inherently provided by virtue of the 10-bit addressing update.

A second aspect of the memory management unit is its indirect updating of addresses by the instruction-specified values 0, +1, +2, +3, −1, −2, or −3 as well as by the index-register value X. This flexible addressing scheme is particularly useful in decimation applications.

A third aspect of the memory management unit is in its support of a dual-bus embodiment of the PSP, in which two operands are supplied simultaneously to the ALU for processing, which improves operating speed and makes more efficient use of the resources of the DSP chip.

The PSP executes a series of instructions, which permit the user to specify the algorithmic steps to be undertaken during the processing of the data stream. Various ones of these instructions afford user-control over the data movement, and, accordingly, specify operation of the memory management unit of the instant invention via internal address and data paths. An address generation unit is included within the memory management unit which is dedicated to memory address generation. The address generation unit is used during indirect address references and increases the speed of instruction execution.

In a preferred embodiment there are 512 words of internal random access memory organized as two independent memory banks, RAM-A and RAM-B, each containing 256 words. The banks can be accessed in a variety of ways via two address generation units. Both internal memories occupy the address space 00OH to 0FFH. Internal and external memory access is explicitly specified by an instruction so that the external memory address space, 000H to 3FFH is independent from the internal memory address space. RAM-A and external memory via an External Interface Register interface to an internal A-data bus, while RAM-B interfaces to both the internal A- and B-data buses.

Memory data can be addressed both directly via an instruction and indirectly via a register value: the seven least significant bits (LSBs) of a ten-bit direct address are specified by an instruction and the three most significant bits (MSBs) are defined by a Direct Address Page Register (DAPR). The DAPR is a read/write register that interfaces to bit positions 7–9 of the A-data bus.

The Address Generation Units perform post-memory access updating. When memory is indirectly addressed, an offset of 0, ±1, ±2 or ±3 can be directly specified for each register accessed or, alternatively, a preset index value can be used for address update. When an offset is directly specified by an instruction, the 3-bit data from the appropriate Control Bus field is sign-extended to form the 10-bit displacement input to the Address Generation Unit. A 10-bit index register is associated with both the A- and B-Address Generation Units: it is a read/write register and interfaces to the 10 LSBs of the A-data bus. The 10-bit index value is in two's complement representation and has an offset range −512 to 511.

The address register file is an 8×10 dual port device which is used for ten-bit temporary data and indirect address storage. The modulo register file is an 8×7 dual port device which specifies the addressing boundary for the corresponding address register update after it is used for indirect addressing. The address and modulo register files are combined into one unit utilizing the same decode logic.

DETAILED DESCRIPTION OF PREFERRED EMBODIMENTS

The memory management unit of the instant invention is best described first in an embodiment of a digital signal processor (DSP) having a dual-bus architecture, and second, in an embodiment of a DSP having a single-bus architecture.

Figure 1A:
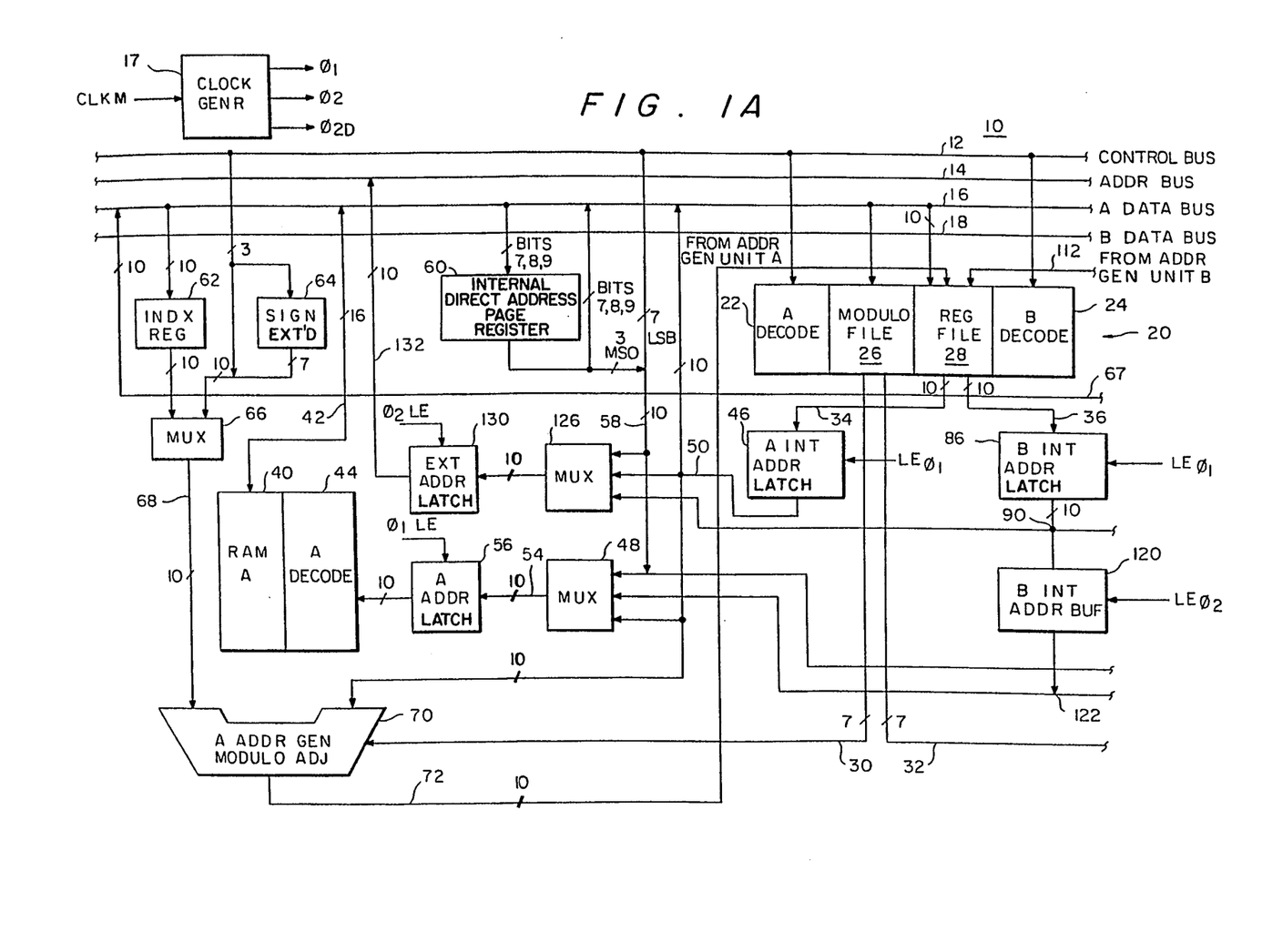
FIG. 1A and 1B together are a block diagram of the memory management unit of the instant invention.
Figure 1B:
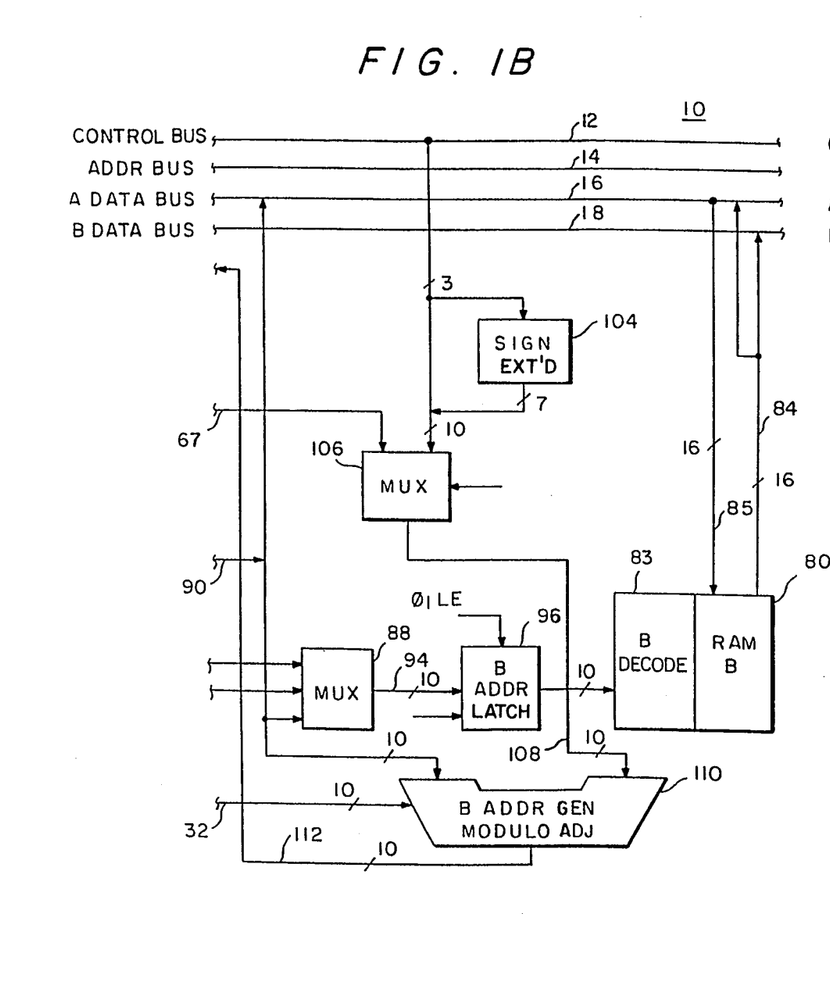

With reference to FIG. 1A and FIG. 1B a memory management unit (MMU) 10 according to the instant invention is illustrated in block diagram form. Shown in FIG. 1A are the elements of the A-side address generation unit of MMU 10 and the register/modulo file portion 20. Shown in FIG. 1B are the elements of the B-side address generation unit.

Various signal lines are shown in the figures as a single line, which are in fact multiple-conductor lines carrying several signals in parallel. Such lines are hash-marked on the figures with an adjacent numeral indicating the number of multiple conductors. Also, various elements shown in the figures receive control signals from an instruction-decode programmable logic array (PLA), not shown. The generation of these control signals are well understood by those skilled in the art and will not be described herein.

With reference to FIGS. 1A and 1B, a set of four busses is shown connected to various elements thereon. A control bus 12 conducts signals generated by a microsequencer portion of the DSP, not shown. Control signals are conducted via bus 12 from the microsequencer to the various elements of the MMU in response to instructions executed by the microsequencer.

An external address (ADDR) bus 14 provides address signals for an external memory which may be used with the MMU 10. A description of this aspect of the MMU 10 of the present invention is given below in connection with FIG. 2.

A pair of busses, 16 and 18, conduct signals representing data between the various elements of the DSP and the MMU 10. In the discussion contained herein, these data busses are referred to as the A_DATA and B_DATA bus, respectively. These various elements of the DSP include the microsequencer, an arithmetic logic unit (ALU), and interface logic. A clock generation portion 17 of MMU 10 receives a master clock (CLKM) signal and generates therefrom a phase 1 ($O_1$) clock signal, and a phase 2 ($O_2$) and phase 2 delayed ($O_2D$) signals.

The MMU 10 includes a register/modulo file 20 which will be described in greater detail below in connection with FIG. 3. Briefly, an A_Decode and a B_Decode portion 22 and 24, respectively, of register/modulo file 20 are connected to the control bus 12 and receive thereby signals generated by the microsequencer which cause the A_Decode or B_Decode portion to generate signals which, in turn, control accessing of a register in modulo file portion 26 and a register-in address file portion 28 of the register/modulo file 20. The modulo file portion 26 generates modulo control signals to the A-side and B-side addressing units via signal lines 30 and 32, respectively. Modulo values for selecting the modulus of arithmetic to be performed in combining an address offset value with a register selected from address file portion 28 are stored in qualification corresponding fields of modulo file portion 26. The register file portion 28 generates address signals to the A-side and B-side addressing units via signal lines 34 and 36, respectively. The contents of the registers within the module file 26 and the contents of the registers within the register file 28 are partitioned into fields, each field conducted by signal lines 30, 32 and 34, 36, respectively.

A random access memory (RAM)_A 40 is provided to store data and is connected to the A_DATA bus 16 via bidirectional signal lines 42. RAM_A can preferably store 256 data words, each having an "address". The contents of each address can be read from, or written to, according to the signals applied to an A_address decode (A_DECODE) circuit 44, as will be appreciated by those skilled in the art.

The MMU10 can use either a one- or a two-cycle data management timing scheme. (The two-cycle scheme is used only when reading from external memory.) The A-side address generated by register file 28 is conducted via signal lines 34 to an A-side internal address latch (A_INT_ADDR_LCH) 46 which is enabled during the first cycle of the one- or two-cycle data management timing scheme employed by MMU 10. The timing scheme will be described in detail hereinafter in connection with FIG. 5. The latched address signal is conducted from A_INT_ADDR_LCH 46 to a multiplexer (MUX) 48 via signal lines 50.

MUX 48 also receives data signals from the Control bus 12 via signal lines 58 and an address generated by a B-side address generation unit, as will be described hereinafter. A direct address received by MUX 48 consists of a least-significant seven-bit portion received from control bus 12 and a most-significant three-bit portion generated by an internal direct address page register (INT_DAPR) 60. A control signal generated by an instruction decode PLA, not shown, causes MUX 48 to select either the address signals generated by the A-side or B-side address generation unit to be generated on signal lines 54. These signals are, in turn, received by a RAM_A address latch (A_ADDR_LCH) 56, which contents is updated during O$_1$ and the latched address signals are applied to the A_DECODE circuit 44 for use in accessing the contents of the specified address within RAM_A 40.

The INT_DAPR 60 receives signals representing the seventh, eighth, and ninth bits of the signals on the A_DATA bus 16 and can generate a set of three signal bits representing "page" information. The seven least-significant bits as specified by an instruction executed by the microsequencer of the DSP are conducted on the control bus 12 and the three most-significant bits generated by the INT_DAPR 60 are combined to form a ten-bit direct address and signals representing this RAM_A address are conducted to the MUX 48 via signal lines 58.

A 10-bit index register (INDX REG) 62 receives signals representing the ten least-significant bit positions of the A_DATA bus 16. This index value is represented in two's complement notation, providing an offset in the range −512 to +511. Alternatively, when an index value is not specified, an offset of 0, ±1, ±2, or ±3 can be specified by an instruction executed by the microsequencer and a set of three data signals corresponding to the offset value conducted from the control bus 12 to a sign extension (SGN EXT'D) circuit 64 to form a ten-bit value. To indirectly address the RAM_A 40 the ten-bit signals generated by INDX_REG 62 and SIGN EXT'D circuit 64 are conducted to a multiplexer 66 which causes one of the inputs to become a "displacement" value consisting of ten bits to be generated on signal lines 68. The signals generated by INDX_REG 62 are also conducted via a signal line 67 to a multiplexer (MUX) 106 performing a function analogous to that of MUX 66, on the B-side address generation unit.

An A-side address generator and modulo adjuster (A_ADDR_GEN_MODULO_ADJ) 70 receives at a first input the displacement signals via lines 68 and at a second input the address signals via lines 50. A_ADDR_GEN_MODULO_ADJ 70 then generates the sum of the 10-bit address signals on lines 50 and the 10-bit displacement signals on lines 68 in a parallel addition adjusted by a modulo control, and the resulting address is conducted to the register file 28 via signal lines 72 as will be described with reference to FIG. 4, below.

An integer modulus-adjustment of 0 to 64, 128, 256 and 512 can be stored in the modulo file portion 26 using a code shown in Table I, hereinafter, of register/modulo file 20 and signals representing the selected modulo conducted to a third input of A_ADDR_GEN_MODULO_ADJ 70 via signal lines 30. In this manner, the content of the selected modulo register determines the indirect address range generated by A_ADDR_GEN_MODULO_ADJ 70 to be used for memory addressing.

A B-side address generation unit comprising a RAM B 80, a B_DECODE 83, a B_INT_ADDR_LCH 86, a MUX 88 connected by signal line 90, a B_ADDR_LCH 96 connected to MUX 88 via signal line 94, the INDX_REG 62, SIGN EXTD 104, MUX 106 connected to a first input of a B_ADDR_GEN_MODULO_ADJ 110 also receiving an address from line 90 and a modulus adjustment via signal line 32 generates on signal lines 112 a memory address.

The B-side address generation unit operates similarly to the A-side as described hereinbefore and its operation will therefore not be described in detail, except to note that the read port of RAM_B 80 is connected to the A_DATA bus 16 and the B_DATA bus 18 via signal lines 84 and the write port of RAM_B is connected to the A_DATA bus via signal lines 85. A B-side internal address buffer (B_INT_ADDR_BUF) 120 receives the contents of B_INT_ADDR_LCH 86 via signal lines 90. The B_INT_ADDR_BUF 120 is required to delay the access of memory internal to the MMU 10. As such, the B_INT_ADDR_BUF 120 receives a latch enable signal during O$_2$ of the timing scheme, thereby delaying the generation at its output of an internal address to occur such that data from both external and internal memory becomes available simultaneously because of the overhead cost of accessing external memory when operands are to be fetched from both internal and external memory concurrently. The delay is also needed when external memory is written to internal memory, or a register. The address generated by B_IN- T_ADDR_BUF 120 is conducted to the second inputs of MUX 48 and MUX 88 via signal lines 122.

A multiplexer (MUX) 126 receives the latched addresses from A_INT_ADDR_LCH 46, B_INT_ADDR_LCH 86 via signal lines 50 and 90, respectively, and the direct address via signal lines 58. Under control of signals generated by an instruction decode PLA, MUX 126 generates a set of external address signals to an external address latch (EXT_ADDR_LCH) 130. EXT_ADDR_LCH 130, in turn, applies the address signals to the ADDR bus 14 via signal lines 132, after latch 130 receives a latch enable (LE) signal during $O_1$.

The related, copending application U.S. Ser. No. 07/309,976 entitled "A Storage Arrangement Having a Pair of RAM Memories Selectively Configurable for Dual Access and Two Single Access RAMs" now issued U.S. Pat. No. 4,893,279. describing the operation of RAM_A 40 and RAM_B 80 in either a single- or a dual-access mode, and this description is incorporated by reference herein.

Figure 2:
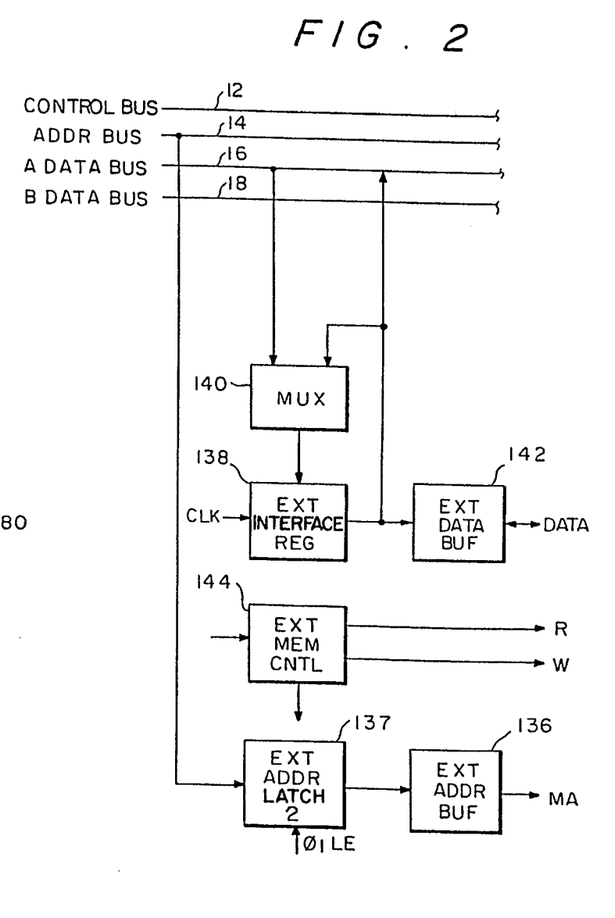
FIG. 2 illustrates the interconnection of the memory management unit for an external memory.

With reference to FIG. 2, the address for external memory is latched into an external address latch (EXT_ADDR_LCH_2) 137 during phase $O_2$ of the first cycle of data management. An external address buffer (EXT_ADDR_BUF) 136 provides the address on a set of external memory access (MA) terminals.

An external interface register (EXT_INTF_REG) 138 serves to conduct all the data conducted between the DSP and the external memory. An input to a multiplexer (MUX) 140' is connected to A_DATA bus 16. During writing to the external memory, data signals on the A_DATA bus 16 are stored in the EXT_INTF_REG 138 during $O_2$ of the first cycle of data management. The contents of the EXT_INTF_REG 138 are then conducted to an external data buffer (EXT_DATA_BUF) 142 during $O_2D$ (delayed), for application to a port of the DSP. To read data from the external memory, signals applied to the port of the DSP are conductd via EXT_DATA_BUF 142 and MUX 140 to the EXT_INTF_REG 138 during $O_2D$ of the second cycle of data management and the contents of the EXT_INTF_REG 138 are conducted to the A_DATA bus 16 during the next $O_2$. An external memory control (EXT_MEM_CNTL) 144 generates read (R) and write (W) signals used during $O_2D$.

Figure 3:
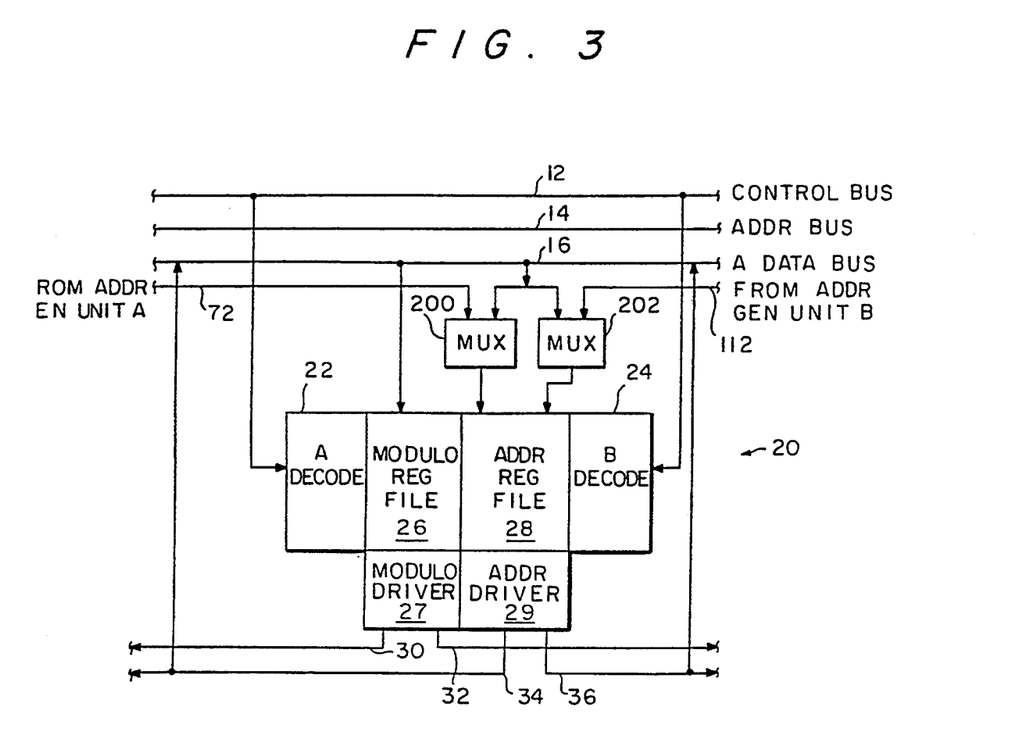
FIG. 3 is a block diagram of the register file portion of the memory management unit.

A description of the register/modulo file 20 is best given with reference to FIG. 3. The address register file portion 28 has a set of eight 10-bit registers used for temporary storage of data and indirect addresses. The modulo register file portion 26 has a set of eight 7-bit registers used to specify the address boundary for indirect address updating. The A_DECODE and B_DECODE portions 22 and 24 serve to provide access to both register files 26 and 28 by generating an address for each from control information supplied via control bus 12.

Address register file 28 has two input and two output ports and two internal ten-bit busses. Each input port can receive data from either the ten least-significant bit positions of A_DATA bus 16 (writing the contents of a register) or the respective address generation unit (automatic updating the contents of a register). A first multiplexer (MUX) 200 is connected to bus 16 and signal lines 72, and a second multiplexer (MUX) 202 is connected to bus 16 and signal lines 112. A control signal is applied to each of MUXs 200 and 202, generated by the microsequencer, to determine the source of data for each input of the ADDR REG FILE 28.

The MMU 10 provides two forms of memory addressing: direct and indirect. The form used is determined by the instruction executed by the microsequencer portion of the DSP. For direct addressing, the instruction specifies the seven least-significant bits of the direct address (DAB) supplied via the control bus 12. The three-bit contents of the INT_DAPR 60 are concatenated with the DAB to form a 10-bit direct address (DA) which is conducted to MUX 48, to MUX 88, and MUX 126 for addressing RAM_A 40, RAM_B 80, and external memory, respectively.

For indirect addressing, the instruction specifies one of the eight registers within register file 28 whose 10-bit contents will be used for addressing RAM_A 40, RAM_B 80 or external memory. As will be explained in conjunction with adjusters 70 and 110, the instruction also specifies an "update" operand of 0, $\pm 1$, $\pm 2$, or $\pm 3$ used in conjunction with one of the eight registers within modulo file 26. An updated memory address is then calculated by adding the contents of the specified register within file 28 to the value of update operand. The latter register's location calculated using modular arithmetic with the modulus contained in the corresponding register within file 26. This updated address is used for accessing data from memory in the next instruction which specifies this same register for an indirect memory address. For example, an instruction of the form READ MA@RI+2 MB§RO-1 calls for reading the contents of RAM_A 40 at the location specified by the contents of the first register and determining the update address by adding two to the contents of the first register within file 28, computing the latter result controlled by the modulo value in the contents of the first register within file 26. The instruction calls for concurrently reading the contents of RAM_B 80 at the location specified by the contents of the zeroth register and determining the updated address by subtracting one from the contents of the zeroth register within file 28, computing the latter result controlled by the modulo value in the contents of the zeroth register within file 26.

An instruction specifying indirect addressing can also specify the update value to be from an index register. The contents of one of the registers within address register file 28 is added to the contents of the index register 66 the resulting sum corrected by the modulo value specified forms the updated address.

Data is loaded into the address register file 28 from the A-data 16 bus during $O_2$ of the first cycle of data management when an instruction specifies that data on A data bus 16 be copied into a register or from the respective Address Generation Unit during the same $O_2$, when the unit is specified to perform an indirect address update. The output from the address register file 28 is generated by an address driver 29 and then applied to its respective A- or B-Internal Address Latch 46 or 86 during $O_1$ of the first cycle of data management. Each Address Latch drives the A-data bus during the first cycle of data management when the contents of a register within file 28 are to be copied to a specified destination.

In response to signals generated by the microsequencer, the register file decoders 22 and 24 determine which register of register file 28 is selected and which internal bus is to be used to transfer data to or from a register or memory. A register accessed for an indirect address is decoded by the A-decoder 22 for all RAM-A 40 or external memory source accesses and RAM-A 40 or external memory destination accesses where the source is RAM-B 80 or an internal register. The A-decoder 22 is also used for all address register file 28 source accesses where the destination is not an indirectly addressed RAM-A or not an indirectly addressed external memory and address register file 28 destination accesses where RAM-B is the source.

A register accessed for an indirect address is decoded by the B-decoder 24 for all RAM-B 80 source accesses and all memory destination accesses for which the A, decoder 22 does not perform the decode as described above. The B-decoder 24 is also used for all address register file 28 source and destination accesses where the A-decoder 22 does not perform the decode as described above.

The modulo register file 26 has one input port and two output ports. The input port of the modulo register file 26 receives the data signals on the seven least-significant bit positions of the A-data bus 16 during $O_2$ of the first cycle of data management for an instruction which directly or indirectly references an operand to be stored in a register within modulo file 26. Signals generated at the output ports of the file 26 control the indirect address update boundaries for the respective Address Generation Unit. The contents of a location within modulo register file 26 are valid for the first cycle of data management. The decoder used to select a modulo register from the modulo register file 26 during indirect addressing or a modulo register source access is the same decoder which selects the corresponding register from the address register file 28 during indirect addressing or an address register source access, respectively.

The signals generated at the output ports of modulo register file 26 are applied to a modulo driver 27 and the resulting signals conducted via signal lines 30 and 32 to the A_and B_ADDR_GEN_MODULO_ADJ 70 and 110, respectively. A new address for indirect memory access is then computed by the A- or B-side Address Generation Unit during $O_2$ of the first cycle of data management. The computation is based on the present memory address and the user-specified displacement and modulo range.

The displacement parameter is specified by an instruction executed by the microsequencer which indirectly accesses memory of the DSP and the modulo parameter is preset by another instruction.

Figure 4:
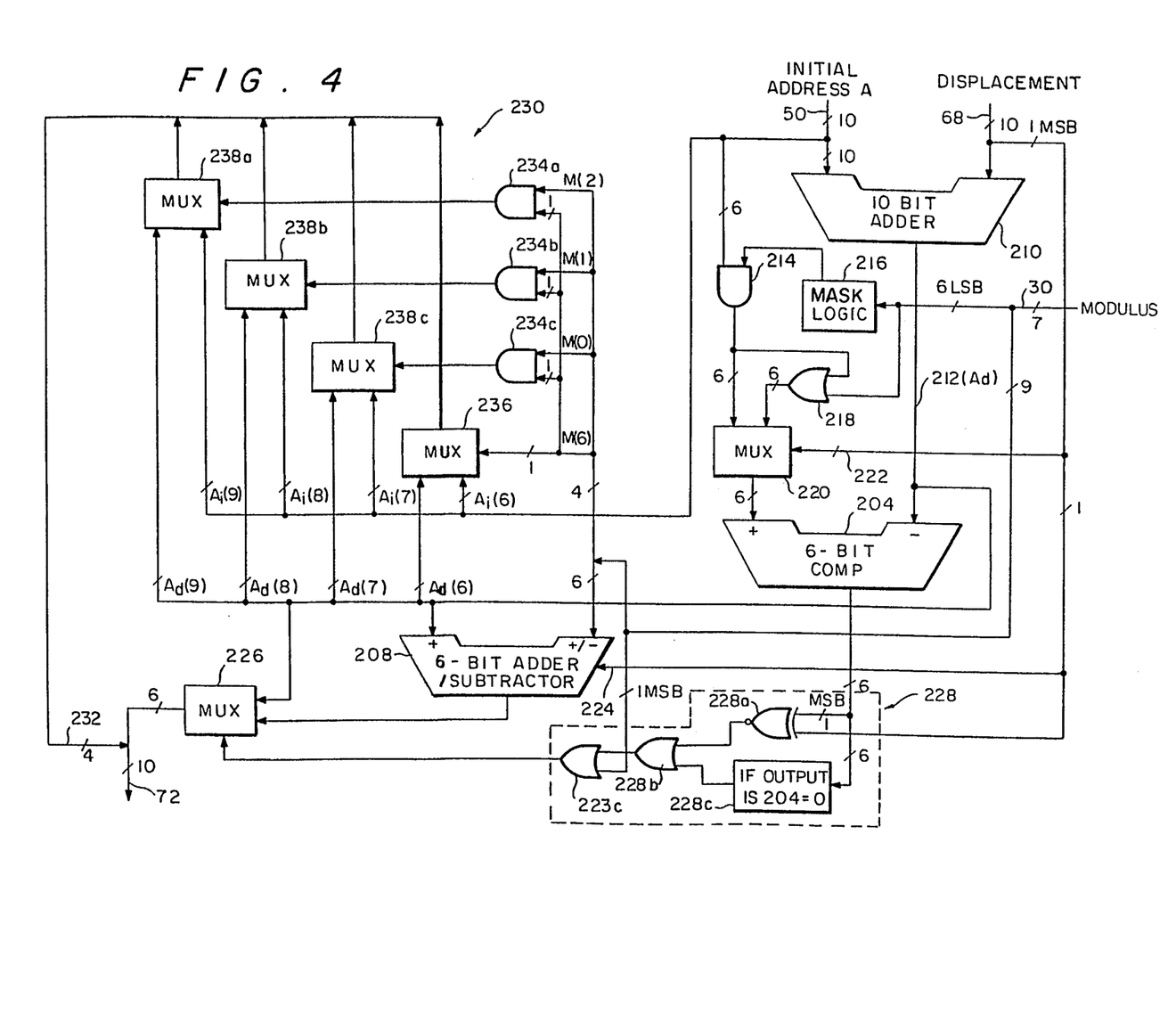
FIG. 4 illustrates the address generation unit portion of the memory management unit.

With reference to FIG. 4, a ten-bit adder 210 forms a displaced address from the signals on lines 50 from register file address driver 29 and the displacement value received on signal lines 68. This action occurs during $O_2$ in response to an instruction executed by the microsequencer.

The output of address adder 210 is adjusted in accordance with the signals received on lines 30 from modulo file driver 27. The contents of a modulo register within file 26 determines the indirect addressing range for the corresponding register within address register file 28 selected for addressing of memory RAM_A 40, or RAM_B 80 or external memory. For instance, specifying that register three in file 26 is to be modulo 8, causes only the three least-significant bits of address register three in file 28 to be updated, while for modulo 32, the five least-significant bits are updated. For a specified modulo of 23 the operation is as though a modulus of 32 was specified, and the remaining 9 locations are not addressable through indirect address update.

For a given displacement, D, and modulo range, N, as specified by an instruction, as represented by signals on lines 68 and 30, respectively, the modulo-adjusted address, $A_m$, generated by A_ADDR_GEN_MODULO_ADJ 70 is determined from the displaced address, $A_d$, as based on the computation described above and the upper (lower) bound address, $A_{UB}$ ($A_{LB}$), for a negative (positive) displacement as follows:

$A_m = (A_d - A_{UB})$ MOD $N + A_{UB}$, for $D < 0$ $A_m = (A_d - A_{LB})$ MOD $N + A_{LB}$, for $D \geq 0$ where the upper and lower bound addresses are derived from the modulo range and the initial address to be updated, $A_i$, generated at the output of the register file drivers 27 and 29, respectively. The lower bound address is formed from X least-significant bits equal to zero, where X is the number of binary bits needed to represent (N-1), and the (10-X) most-significant bits of $A_i$. The upper bound address is determined as the binary value (N-1) logically ORed with $A_{LB}$. The displacement specified is less than or equal to the modulo range specified. The modulo-adapted address $B_m$ generated by B_ADDR_GEN_MODULO_ADJ 110, on line 112, determined in a manner analogous to that described for $A_m$.

Modulo ranges 2-64 are implemented by circuitry that controls the six least-significant bit positions of an address, while circuitry to implement modulo ranges 128-1024 controls the four most-significant bit positions of an address as will be described.

Adjustment of an address within a modulo range 2-64 is provided by a portion of A_ADDR_GEN_MODULO_ADJ 70 consisting of an upper and lower bound address generator, a six-bit Boundary Check subtracter comparator 204 and a six-bit Address Adjust Adder/Subtracter 208. Signals representing the initial address received on lines 50 and the displacement on lines 68 are applied to the input ports of a 10-bit adder 210 and signals representing the resulting sum are conducted to an input port of the six-bit comparator 204 via signal lines 212.

The six least-significant bit positions of the lower bound address is generated by a set of AND gates 214 receiving signals representing the corresponding bit positions of $A_i(3)$ and $K(3)$ for j=0,1,2,3,4,5, where K(j) is the output of a mask generator 216 described below. The six least-significant bit positions of the upper bound address is generated by a set of OR gates 218 receiving signals representing the six least-significant bit positions received on lines 30 the modulo register driver 27 and signals representing the six least-significant bit positions of the lower bound address generated by AND gates 214. For modulii in the range 2-64, the four most-significant bits of $A_m$, the address to be written into the address register file 28 after indirect address update, are the same as the four most-significant bits of $A_i$, the address to be updated. A set of multiplexer (MUX) 220 receives the signals generated by the AND gates 214 and the OR gates 218, and a signal from the most-significant bit position of line 68 applied at a terminal 222 of MUX 220 allows selection of the lower or upper bound address.

The Boundary Check Subtracter comparator 204 generates a signal if a displaced address exceeds the modulo boundary. It performs two's complement arithmetic. For a non-negative displacement (D≧O), the six least-significant bits on lines 212 of $A_d$ are applied to comparator 204 and subtracted therein from the six least-significant bits of the upper bound address generated by MUX 220. If the result is less than zero then $A_d$ exceeds the upper bound address and the result from the Address Adjust Adder/Subtracter 208, $A_a$[5-0], forms $A_m$[5-0]. If the result is greater or equal to zero then $A_d$ is within the modulo boundary and $A_a$[5-0] forms $A_m$[5-0]. For a negative displacement (D<O), $A_d$[5-0] is subtracted within comparator 204 from $A_{LB}$[5-0] as generated by MUX 220. If the result is greater than zero then $A_d$ exceeds the lower bound and $A_a$[5-0 ] forms $A_m$[5-0 ]; otherwise, $A_d$[5-0 ] forms $A_m$[5-0].

The Address Adjust Adder/Subtracter 208 generates an adjusted address, $A_a$, from signals received on lines 212 representing $A_d$[5-0] and the six least-significant bit positions generated by the modulo register driver 27. For a positive displacement, an ($A_d$-N) operation is needed to compensate for upper boundary overflow. Since the output of the modulo register driver 27 is (N-1), one's complement subtraction is performed by 6-bit adder/subtractor 208 to obtain the adjusted address. For a negative displacement, ($A_d$+N) compensates for lower boundary underflow and is achieved by setting the carry in bit during addition by adder/subtractor 208. The Address Adjust Adder/Subtracter 208 operation occurs in parallel with the Boundary Check Subtracter 204 operation and the add or subtract operation is determined by a select signal applied from the most-significant bit position of line 68 to a terminal 224 of 6-bit adder/subtractor 208.

A set of multiplexers (MUX) 226 receive the signals generated by the 6-bit adder/subtractor 208 and the six least-significant bit positions of lines 212. A signal generated by comparator 204 is applied to logic circuit 228 which generates a control signal applied to MUX 226. The latter signal selects either the six least-significant bits of the adjusted address generated by the six-bit adder/subtractor 208 or the displaced address from lines 212.

Logic circuit 228 comprises an exclusive OR (XOR) gate 228a which receives at a first input the most-significant bit position of signal lines 68 and at a second input the sign of the result generated by 6-bit comparator 204. The signal generated at a complemented output of XOR gate 228a is conducted to a first input of an OR gate 228b. The second input of OR gate 228b receives a signal generated by a logic block 228c. This latter signal being a logic HIGH if the six-bit output signal generated by six-bit comparator 204 is ZERO, and a logic LOW otherwise. An OR gate 228d receives at a first input the signal generated by OR gate 228b and at a second input the most-significant bit position of signal lines 30. The control signal generated by OR gate 228d is conducted to MUX 226.

The signals generated as the output of MUX 226 form the output of A_ADDR_GEN_MODULO_ADJ 70. Circuitry similar to that described in connection with FIG. 4 is contained within B_ADDR_GEN_MODULO_ADJ 110, but will not be described herein.

Mask generator (MSK LOGIC) 216 receives the signals on lines 30 generated by the modulo driver 27 and generates signals $K_j$ applied at a second terminal of AND gates 214 in accordance with the following Table I.

TABLE I

| MODULO REGISTER OUTPUT | | | | | | | MODULO | MASK GENERATOR OUTPUT | | | | | |
|---|---|---|---|---|---|---|---|---|---|---|---|---|---|
| M6 | M5 | M4 | M3 | M2 | M1 | M0 | RANGE | K5 | K4 | K3 | K2 | K1 | K0 |
| 0 | 0 | 0 | 0 | 0 | 0 | 0 | — | 1 | 1 | 1 | 1 | 1 | 1 |
| 0 | 0 | 0 | 0 | 0 | 0 | 1 | Modulo 2 | 1 | 1 | 1 | 1 | 1 | 0 |
| 0 | 0 | 0 | 0 | 0 | 1 | 0 | Modulo 3 | 1 | 1 | 1 | 1 | 0 | 0 |
| 0 | 0 | 0 | 0 | 0 | 1 | 1 | Modulo 4 | 1 | 1 | 1 | 1 | 0 | 0 |
| 0 | 0 | 0 | 0 | 1 | 0 | 0 | Modulo 5 | 1 | 1 | 1 | 0 | 0 | 0 |
| . | . | . | . | . | . | . | . | . | . | . | . | . | . |
| 0 | 0 | 0 | 0 | 1 | 1 | 1 | Modulo 8 | 1 | 1 | 1 | 0 | 0 | 0 |
| 0 | 0 | 0 | 1 | 0 | 0 | 0 | Modulo 9 | 1 | 1 | 0 | 0 | 0 | 0 |
| . | . | . | . | . | . | . | . | . | . | . | . | . | . |
| 0 | 0 | 0 | 1 | 1 | 1 | 1 | Modulo 16 | 1 | 1 | 0 | 0 | 0 | 0 |
| 0 | 0 | 1 | 0 | 0 | 0 | 0 | Modulo 17 | 1 | 0 | 0 | 0 | 0 | 0 |
| . | . | . | . | . | . | . | . | . | . | . | . | . | . |
| 0 | 0 | 1 | 1 | 1 | 1 | 1 | Modulo 32 | 1 | 0 | 0 | 0 | 0 | 0 |
| 0 | 1 | 0 | 0 | 0 | 0 | 0 | Modulo 33 | 0 | 0 | 0 | 0 | 0 | 0 |
| . | . | . | . | . | . | . | . | . | . | . | . | . | . |
| 0 | 1 | 1 | 1 | 1 | 1 | 0 | Modulo 63 | 0 | 0 | 0 | 0 | 0 | 0 |
| 0 | 1 | 1 | 1 | 1 | 1 | 1 | Modulo 64 | 0 | 0 | 0 | 0 | 0 | 0 |
| 1 | X | X | X | 0 | 0 | 0 | Modulo 128 | X | X | X | X | X | X |
| 1 | X | X | X | 0 | 0 | 1 | Modulo 256 | . | . | . | . | . | . |
| 1 | X | X | X | 0 | 1 | 0 | — | | | | | | |
| 1 | X | X | X | 0 | 1 | 1 | Modulo 512 | . | . | . | . | . | . |
| 1 | X | X | X | 1 | 0 | 0 | — | | | | | | |
| 1 | X | X | X | 1 | 0 | 1 | — | | | | | | |
| 1 | X | X | X | 1 | 1 | 0 | — | . | . | . | . | . | . |
| 1 | X | X | X | 1 | 1 | 1 | Modulo 1024 (no modulo) | X | X | X | X | X | X |

Circuitry labelled generally by reference numeral 230 and illustrated in the upper left-hand portion of FIG. 4 provides address-adjustment for modulii exceeding 64.

For an address to be updated within the modulo range 128–1024, the three most-significant bits of $A_i$ form the three most-significant bits of $A_m$ where X is the number of binary bits needed to represent (N-1). $A_d[(X-1)-0]$ forms $A_m[(X-1)-0]$. Signals representing the six least-significant bits of $A_d$ are selected by MUX 226 and combined with signals representing the four most-significant bits generated by circuitry 230 on lines 232 to form the adjusted address on signal lines 72.

Signals representing the three bit positions of the contents of the modulo register file 26 M(0), M(1) and M(2), are conducted via signal lines 30 to a first input terminal of a set of AND gates 234a, 234b, and, 234c, as shown in FIG. 4. A signal representing the most-significant bit position generated by the modulo register file M(6) is conducted via signal lines 30 to a second input terminal of each of the AND gates 234a, 234b and 234c.

A multiplexer (MUX) 236 also receives the signal generated by the most significant bit of modulo file 26 which is used as a select control for signals applied to the MUX 236; being the sixth bit position of $A_i$ and $A_d$. A set of multiplexers (MUX) 238a, 238b, and 238c similarly receive the signal generated by AND gate 234a, 234b and 234c, respectively, as a select control for signals applied thereto, being the ninth, eighth and seventh bit position of $A_i$ and $A_d$, respectively. The respective signals generated at the outputs of MUX 236, 238c, 238b and 238a form the most-significant four bit positions of the adjusted address on signal lines 232.

Figure 5:
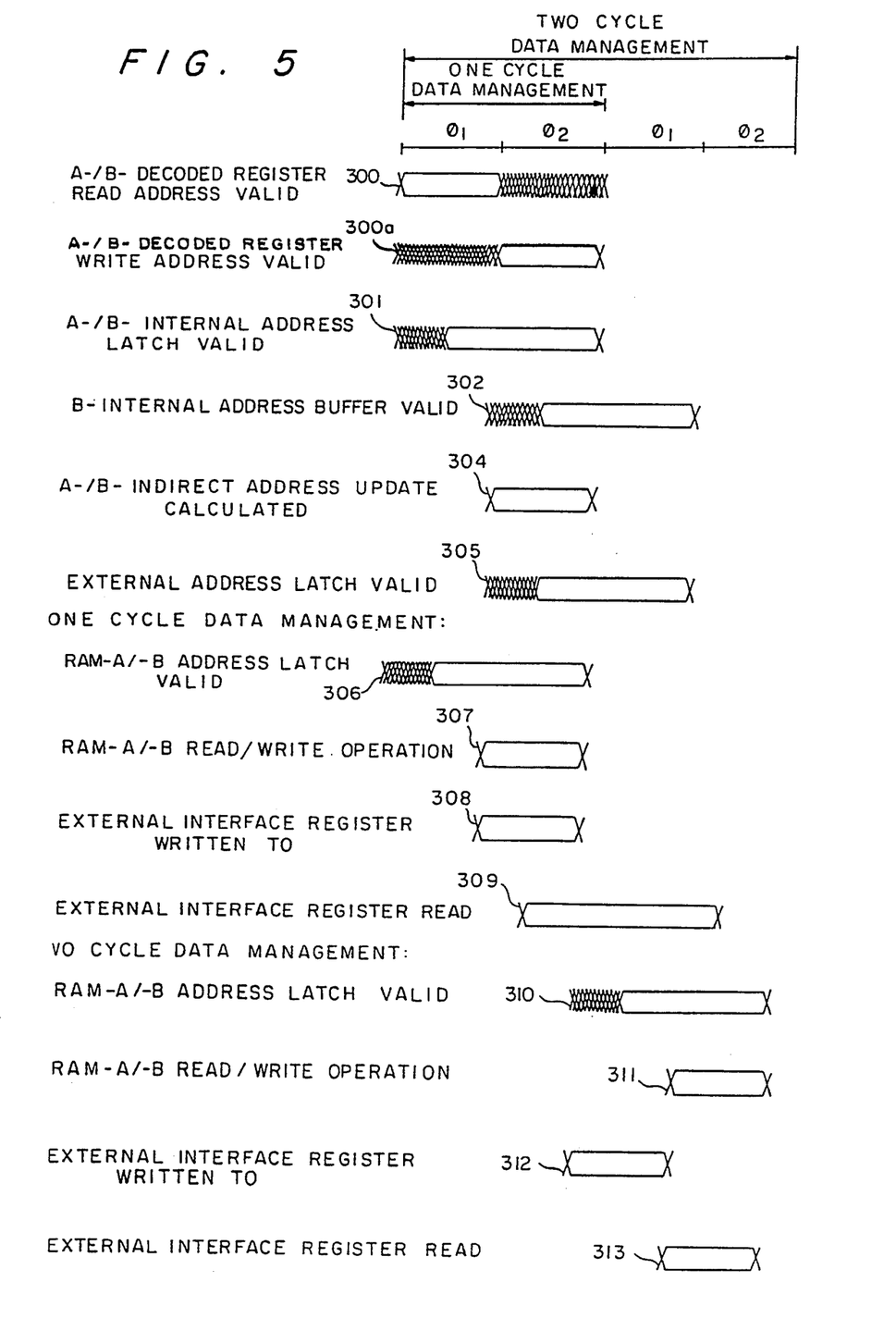
FIG. 5 is a timing diagram of the memory management unit of the instant invention.

FIG. 5 is a timing diagram of the MMU 10 of the present invention. The output of the address register file 28, delayed by one cycle, is required to address the desired internal memory when source data for either of the internal memories is from external memory or when an operand is fetched from both external memory and RAM_B by the same instruction. Accordingly, both a one-cycle and two-cycle data management timing scheme is employed by the MMU 10 of the instant invention, each cycle is of equal duration and consists of a first clock phase $\phi_1$ and a second clock phase $O_2$. The clock generator 19, shown in FIG. 1A, accepts a master clock signal (CLKM) and generates therefrom signals representative of the phase $(O_1)$ and $(O_2)$ within the cycle, and a $O_2$ delayed $(O_2D)$ signal. These timing signals are distributed to the various elements of the MMU 10 shown in FIGS. 1A and 1B and FIG. 2.

With reference to FIG. 5, the output of the registers within file 28 used for indirect addressing are latched into the appropriate Internal Address Latch during $O_1$ of the first cycle of data management as indicated by waveform 301, the address valid beginning in $O_1$ and extending through $O_2$, as indicated by waveform 301. Decoding of these registers for read occurs during the period shown in waveform 300. The corresponding write operation occurs in $O_2$ of the first cycle of data management (waveform 300a). The address for each of the three memory areas (RAM-A 40, RAM-B 80, and external memory) is independently determined from the direct address or one of the register file 28 outputs.

The output of the address register file 28, delayed by one cycle, is required to address the desired internal memory when source data for either of the internal memories is from external memory or when an operand is fetched from both external memory and RAM-B by the same instruction. Accordingly, the contents of the B-Internal Address Latch 86 is copied into the B-Internal Address Buffer 120 during $O_2$ of the first cycle of data management as indicated by waveform 302.

The address generation unit used for indirect address update (which occurs during the period shown in waveform 304) depends on the memory area specified in the source and destination fields of an instruction. The A-Address Generation Unit is used for indirect memory address update for all RAM-A 40 or external memory source accesses. It is also used for RAM-A 40 or external memory destination accesses where the source is RAM-B or an internal register. The B-Address Generation Unit is used for indirect memory address update for all RAM-B source accesses and all memory destination accesses for which the A-Address Generation Unit is not specified above to perform the update.

Data from RAM-A/-B 40/80 is transferred to and from internal registers within the DSP, the opposite internal memory 80/40 and the external memory through the A-data bus 16. The B-data bus is used for transfers from RAM-B to a computational Unit Port B when two operands are fetched by one instruction. Both A- and B-data buses 16 and 18 and the internal memory data lines are precharged during $O_1$ and all data transfers occur during $O_2$.

For writing data to internal memory (RAM_A 40 or RAM_B 80) locations from external memory or for reading data from both RAM_B 80 and external memory when operands are read from both RAM_B 80 and external memory, the appropriate A_ADDR_LCH 56 or B_ADDR_LCH 96 contains a valid address for an internal memory during the second cycle of data management as shown in waveform 310 of FIG. 5. The corresponding read/write operation occuring in $O_2$ of the second cycle of data management as shown in waveform 311. All other types of memory accesses require a one-cycle data management where the signals generated by the RAM -A/-B Address Latch 56/96 is valid during this cycle and data transfer occurs during $O_2$ of this cycle as indicated by waveforms 306 and 307. The address for external memory access is latched into the EXT_ADDR_LCH-2 137 during $O_2$ of the first cycle of data management as indicated by waveform 305.

The External Interface Register (EXT_INTF_REG) 138 is the register through which all data transferred to and from the external memory must pass. When external memory is written to, data on the A-data bus is copied into the EXT_INTF_REG in $O_2$ of the first cycle of data management as indicated by waveform 308. The contents of the EXT_INTF_REG 138 are then output to an external data port by $O_2D$ ($O_2$ delayed) as shown by waveform 309. For an external memory read operation, data from the external data port is latched into the EXT_INTF_REG 138 during $O_1$ of the second cycle of data management (waveform 312) and the contents of the EXT_INTF_REG 138 are transferred to the A-data bus the following $O_2$ as shown by waveform 313.

Figure 6:
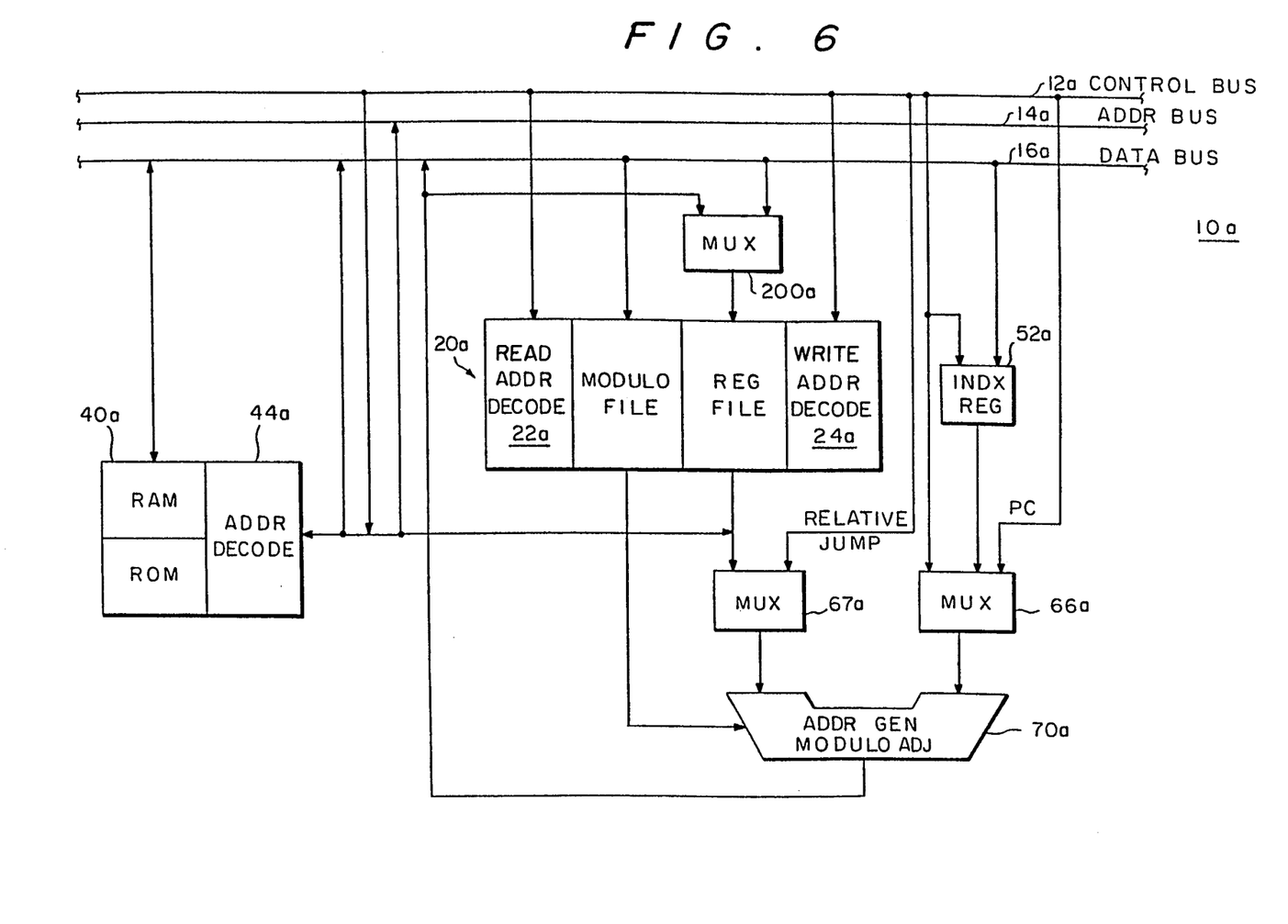
FIG. 6 is a block diagram of a single-bus embodiment of the memory management unit of the instant invention.

Finally, with reference to FIG. 6, a single-bus embodiment of a MMU 10a of the present invention is illustrated in block diagram form. The structure of the single-bus MMU 10a is substantially similar to that of the dual-bus embodiment MMU 10. Accordingly, it will not be described herein, except to indicate that the register/modulo file 20a contains a read address decode portion 22a, a write address decode portion 24a to permit reading and writing data to and from the single data bus 16a.

The MUX 66a also receives signals representing the contents of the program counter (PC) register within the microsequencer. A multiplexer (MUX) 67a is placed within the signal lines connecting address register file 28a to the ADDR_GEN_MODULO_ADJ 70a and a relative address jump value specified by an instruction is conducted to a second input of MUX 67a. The instruction decode PLA can cause the PC and relative jump signals applied to MUX 66a and MUX 67a, respectively, to be conducted to the initial address and displacement inputs of ADDR_GEN_MODULO_ADJ 70 where they can be added to form a jump address. In this manner, no register values within the DSP are destroyed during a relative jump operation.

We claim:

1. In a memory management having an address register file providing initial address signals, and a modulo register file providing modulii signals, an address modulo-adjust unit comprising:
   a) means responsive to bits of said initial address signals for generating sum signals representing the sum of signals representing a user-supplied displacement value and a user-specified one of said initial addresses; and
   b) means responsive to said sum signals and to a user-specified one of said modulii for adjusting said sum signals and for generating a modulo-adjusted address, said address being within a range bounded by said user-specified modulus, said means being responsive to any user specified modulus comprising at least any integer between 0 and 64,
   wherein said means for adjusting comprises:
      (i) first modulo address adjust means responsive to bit values in predetermined bit positions of said sum signals, said initial address signals and said user-specified modulus for providing said modulo-adjusted address for user-specified modulii values in a first range;
      (ii) second modulo address adjust means responsive said bit values in predetermined bit positions of said sum signals said initial address signals and said user-specified modulus for providing said modulo-adjusted address for user-specified modulii values in a second range; and
      (iii) multiplexer means coupled to said first and second modulo-adjust address means for selectably providing either said modulus-adjusted address generated by said first or said second modulo-adjust address;
   wherein said first modulo address means comprises:
      (a) boundary-check means responsive to bit values in said predetermined bit positions of said sum signals, bit values in predetermined bit positions of said initial address signals and to said user-specified modulus for generating a binary-valued signal indicative of whether said address represented by bit values in said bit positions of said sum signals exceeds said user-specified modulus, and
      (b) means responsive to said binary-valued signal and bit values in said predetermined bit positions of said sum signals for selectably adding or subtracting said user-specified modulus to said predetermined bit positions of such sum signals and for generating therefrom a set of signals representing said modulus-adjusted address; and
   wherein said boundary check means comprises:
      means response to bit values of predetermined bit positions of said user-specified modulus for generating therefrom a set of mask signals;
      a plurality of AND gates each responsive to bit valves in a predetermined bit position of said initial address signals and to a predetermined one of said mask signals for generating therefrom an output signal;
      a plurality of OR gates each responsive to a predetermined one of said signals generated by said AND gates and to a predetermined bit position of said user-specified modulus for generating therefrom an output signal;
      a plurality of multiplexer means each coupled to a predetermined one of said AND gates and a predetermined one of said OR gates for selectably providing a signal, being either said signal generated by said AND gate or said OR gate, in response to a predetermined sign bit position of said user-specified displacement value; and
      comparator means receiving at a first input said signals provided by said multiplexer-means and at a second input said predetermined bit positions of said sum signals for generating said binary-valued signal.

2. In a memory management unit having an address register file providing initial address signals, and a modulo register file providing modulii signals, an address modulo-adjust unit comprising:
   a) means responsive to bits of said initial address signals for generating sum signals representing the sum of signals representing a user-supplied displacement value and a user-specified one of said initial addresses; and
   b) means responsive to said sum signals and to a user-specified one of said modulii for adjusting said sum signals and for generating a modulo-adjusted address, said address being Within a range bounded by said user-specified modulus, said means being responsive to any user specified modulus comprising at least any integer between 0 and 64;
   wherein said means for adjusting comprises:
      (i) first modulo address adjust means responsive to bit values in predetermine bit positions of said sum signals, said initial address signals and said user-specified modulus for providing said modulo-adjusted address for user-specified modulii values in a first range;
      (ii) second modulo address adjust means responsive said bit values in predetermined bit positions of said sum signals, said initial address signals and said user-specified modulus for providing said modulo-adjusted address for user-specified values in a second range; and
      (iii) multiplexer means coupled to said first and second modulo-adjust address means for selectably providing either said modulus-adjusted address generated by said first or said second modulo-adjust address means wherein said second modulo-adjust address means comprises:
   a plurality of AND gates each responsive to bit values in predetermined bit positions of signals representing said user-specified modulus for generating therefrom an output signal;
   a plurality of multiplexer means each coupled to a predetermined one of said AND gates for selectably providing a signal being either a predetermined bit position of said sum signals or a predetermined bit position of said initial address signals, in response to said signal generated by said predetermined AND gate; and multiplexer means coupled to a predetermined bit position of said signals representing said user-specified modulus for selectably providing a signal being either a predetermined bit position of said sum signals or a predetermined bit position of said initial address signals, in response to said signal representing said predetermined bit position of said user-specified modulus.

3. In the memory management unit according to claim 2, an address modulo-adjust unit wherein an adding/subtracting means is further responsive to a predetermined sign bit position of said user-specified displacement value, whereby addition or subtraction is undertaken responsive to said binary-valued signal generated by said boundary check means and to said sign bit position.

* * * * *